United States Patent [19]
Seymour

[11] Patent Number: 5,127,884
[45] Date of Patent: Jul. 7, 1992

[54] CHAIN AND SPROCKET COMBINATION

[76] Inventor: Timothy H. Seymour, 9544 Moran St., Biloxi, Miss. 39532

[21] Appl. No.: 668,957

[22] Filed: Mar. 13, 1991

[51] Int. Cl.⁵ .................. F16G 13/00; F16H 55/00
[52] U.S. Cl. ................................ 474/155; 474/156; 474/231
[58] Field of Search ........................ 474/155–157, 474/206, 207, 209, 230, 232–234

[56] References Cited

U.S. PATENT DOCUMENTS

| | | | |
|---|---|---|---|
| 1,894,600 | 1/1933 | Schmidt | 474/230 X |
| 1,958,139 | 7/1934 | Gammeter | 74/32 |
| 1,973,214 | 10/1934 | Lamb | 305/10 |
| 2,553,646 | 5/1951 | Field | 474/231 X |
| 2,647,023 | 7/1953 | Kubaugh | 474/231 X |
| 3,153,348 | 10/1964 | Kuntzmann | 474/231 |
| 4,116,497 | 1/1978 | Schimpf | 305/41 |
| 4,227,422 | 10/1980 | Kawashima et al. | 474/156 |
| 4,261,214 | 4/1981 | Watanabe et al. | 474/156 |
| 4,428,739 | 1/1984 | Shimano | 474/231 |
| 4,671,783 | 4/1987 | Seymour | 474/148 |

OTHER PUBLICATIONS

J. Sasadi and I. J. D'Agati, "Bulk Carriers and Self Unloaders," *Bulk Materials Handling*, (Pittsburgh: Univ. of Pitt., 1973), vol. 2, p. 354.
Acme Chain Sales Literature, Acme Chain Company, p. 102, about 1985.
John Martin, "Continuous Unloaders: The Challenge-The Response," Technical Paper, ICH-CA/USA-1978, Bulk Cargo Conference.
Sumitomo Sales Literature, Sumitomo Heavy Industries, Ltd., about 1984.

*Primary Examiner*—Thuy M. Bui

[57] ABSTRACT

A chain 32 and sprocket 10 combination which reduces chordal action and wear allowing for higher output and greater durability of the devices that use chains and sprockets. The chain 32 has hinged joints equipped with a torsional spring 42 that resist hinging and thus reduces chordal action. The sprocket 10 has cam manipulated teeth 12 that prevent both sprocket tooth and chain wear.

11 Claims, 2 Drawing Sheets

CHAIN AND SPROCKET COMBINATION

BACKGROUND

1. Field Of Invention

This invention relates to a chain and sprocket combination that reduces wear and allows for an increase in the speed of operation of the devices that use chain and sprockets.

2. Description Of Prior Art

Three basic problems exist when a chain engages a sprocket. First, because a chain hinges freely, the rise and fall of the chain relative to a sprocket as it enters and exits the sprocket goes unrestrained. This rise and fall results from a phenomena known as chordal action. (Reference ACME Chain, p. 102.) The unrestrained fall results in the chain's links striking the sprocket with an impact velocity. Therefore, the unrestrained hinging allows the links to act like a hammer causing a detrimental pounding of the chain against the sprocket. Second, engagement of the sprocket teeth with the chain results in a sliding of the chain across the teeth of the sprocket. This sliding motion occurs mainly because the chain is not fully seated on the sprocket when engagement occurs. Third, as a chain hinges about a sprocket sliding friction is produced between the pins and bushings of the chain's hinge joints. These three problems result in slower allowable chain speeds in order to reduce wear and increase durability. Furthermore, all of these problems are magnified as chain size is increased, when lubrication is inadequate, and for abrasive working environments.

U.S. Pat. No. 4,116,497 teaches that a tractor which has caterpillar type track can be made to operate with less noise by equipping the track's hinge joints with an external spring located off to the side of the track. The spring stores some of the energy which is normally lost due to chordal action thus reducing noise. This invention deals specifically with track art and does not clearly teach its use for which there is a separate art classification. Also, this invention does not clearly teach how to eliminate chordal action but rather how to reduce noise which is merely a side effect of chordal action. Furthermore, the embodiments of this invention are so large and heavy that they would not be practical for chain and sprocket applications where, unlike tracked vehicles, large chain size and weight are undesirable.

U.S. Pat. No. 1,958,139 and many others teach the use of an elastomer bushed chain, wherein hinging of the chain takes place by deformation of the elastomer material. This eliminates sliding friction between the pins and bushings of a chain. This also eliminates the need for lubrication. It also allows for operation in abrasive environments without pin and bushing wear. This invention along with the many others dealing with elastomer bushed chains all focus on the elastomer bushings ability to eliminate wear, dampen vibrations, and reduce noise. However, none teach that the detrimental pounding of a chain onto a sprocket caused by chordal action can be reduced or eliminated by using the torsional spring characteristics of the elastomer bushing.

My U.S. Pat. No. 4,671,783 and others teach that a sprocket with a plurality of cam actuated teeth that engage a chain after it is seated on the sprocket will eliminate the sliding of the chain across the teeth. This eliminates the need for lubrication and allows for the chain and sprocket to operate with greatly reduced wear in abrasive environments.

SUMMARY OF THE INVENTION

My invention introduces the combination of a chain and sprocket drive that combines the advantages of the above inventions thus allowing for reduced wear and thus higher speeds. This is an especially useful combination in large pitch chains and sprockets that work in abrasive environments with reduced lubrication. One such use of a chain and sprocket is in the bucket elevator portion of a continuous ship unloader where buckets are connected to a chain and used to elevate bulk cargo such as grain from the hold of a ship. It is very important for the chain of the bucket elevator to be circulated as fast as possible since large heavy unloaders are undesirable. According to references Martin, Sumitomo, and Sasadi/D'Agati continuous ship unloaders have a miximum chain speed of about 200 feet per minute. I have been able to achieve unexpected results by combining the above inventions to manufacture a bucket elevator with a speed of 1200 feet per minute. Furthermore, the combination of the above is not obvious since all the inventions are old and well known in the art and have never been combined to achieve the remarkable results described above.

OBJECTS AND ADVANTAGES

Accordingly I claim the following as my objects and advantages of the invention: to provide the combination of a sprocket that has cam manipulated teeth with a chain that has spring loaded hinge joints that resist hinging. Another objective of my invention is to provide the combination of a sprocket that has cam manipulated teeth with a chain which has elastomer bushed hinge joints, where the elastomer bushings serve the dual purpose of bushing and spring. These said combinations allow for reduced wear which results in higher operating speeds of the devices that use chain and sprocket components.

Readers will find further objects and advantages of the invention from a consideration of the ensuing description and the accompanying drawings.

DRAWING FIGURES

DRAWING REFERENCE NUMERALS

Figure 1:
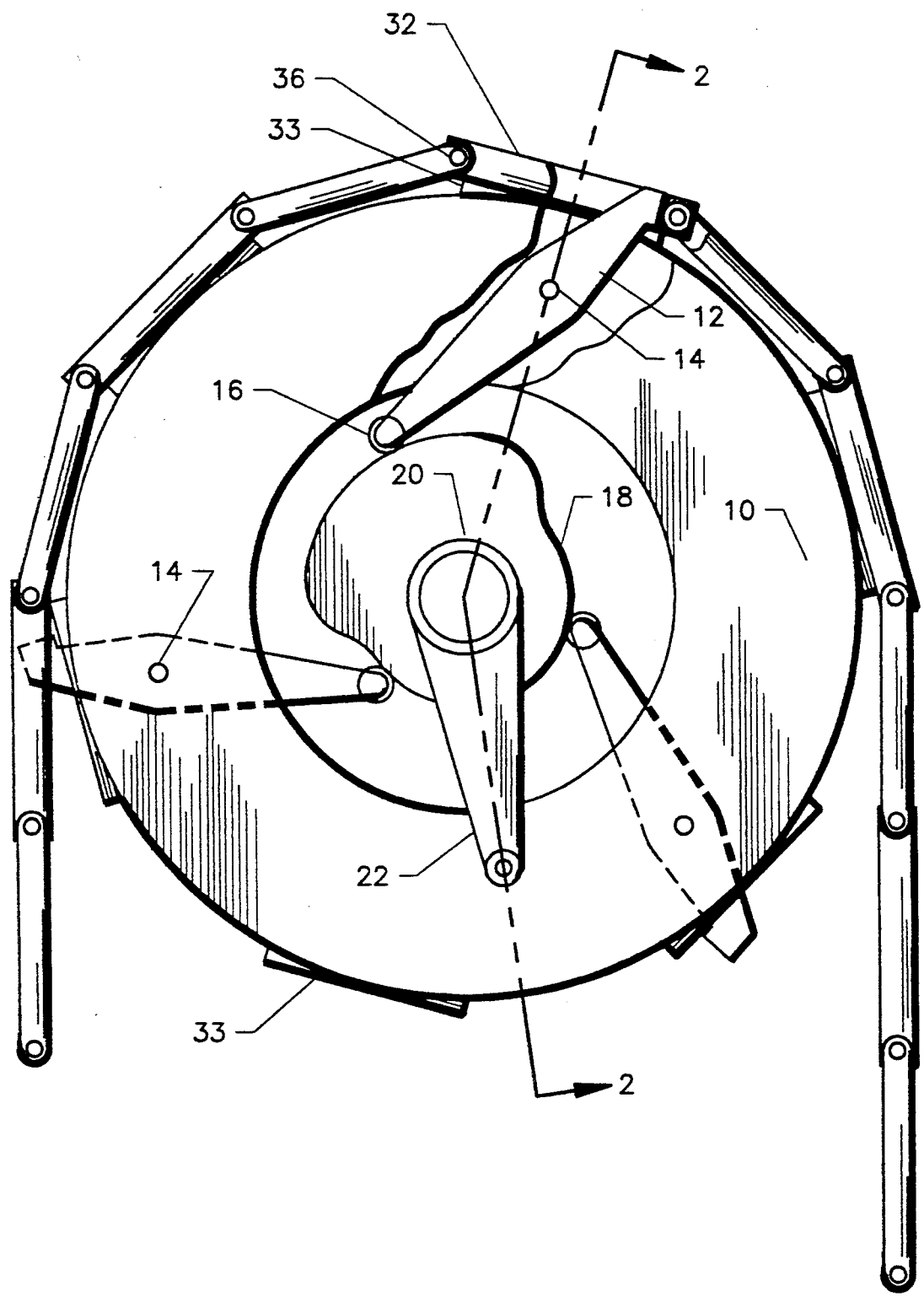
FIG. 1 is a side elevation view according to the invention.

10 sprocket body
12 sprocket teeth 14 pin
16 roller
18 cam
20 shaft
22 torque arm
24 support bearing
26 frame
28 shaft bearing
30 means for translating rotational energy
32 chain
33 support pad
34 outer link plates
36 hinge pin
38 tube 40 inner link plates
42 elastomer bushing

DESCRIPTION OF THE INVENTION

Figure 2:
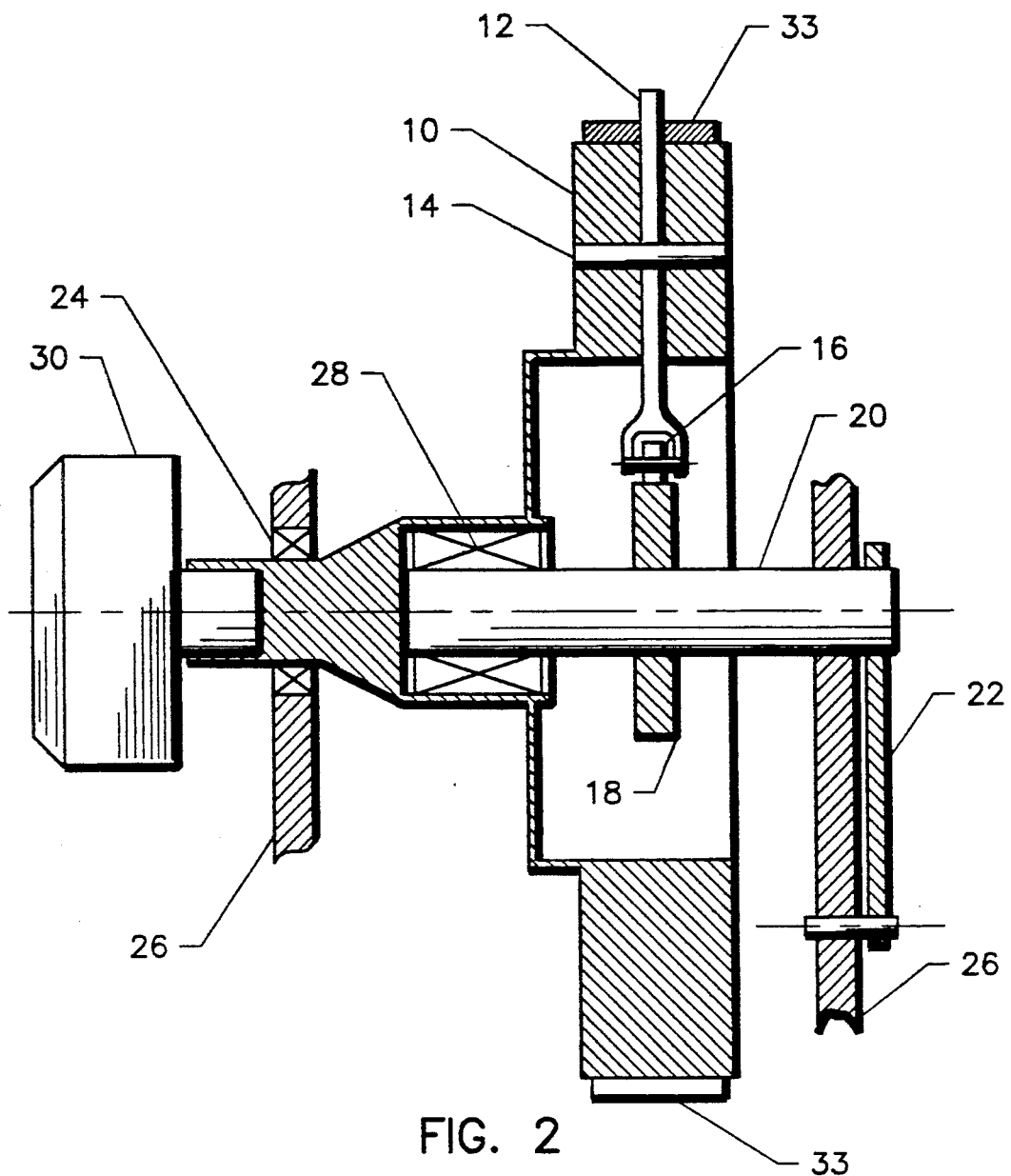
FIG. 2 is a cross sectional view along line 2—2 of FIG. 1.

FIG. 1 shows a sprocket and chain combination according to the preferred embodiment of the invention. The sprocket is comprised of a sprocket body 10 with a plurality of teeth 12 which are hinged to the sprocket body 10 by a pin 14. Referring to FIG. 2 a roller 16 is attached to the inner end of each tooth 12. Roller 16 revolves around a cam 18 which is affixed to a shaft 20 which is prevented from rotating with respect to the sprocket body 10 by a torque arm 22. Said torque arm 22 is connected to a frame 26. The shaft 20 is supported on the torque arm end by the frame 26 and on the other end by the shaft bearing 28 which is supported by the sprocket body 10. The sprocket body 10 is supported on one end by a support bearing 24. Support bearing 24 is carried by the frame 26. The sprocket body 10 is supported on the other end by the shaft bearing 28 which is supported by the shaft 20. A means for transferring rotational energy 30 is connected to the sprocket body 10.

Figure 3:
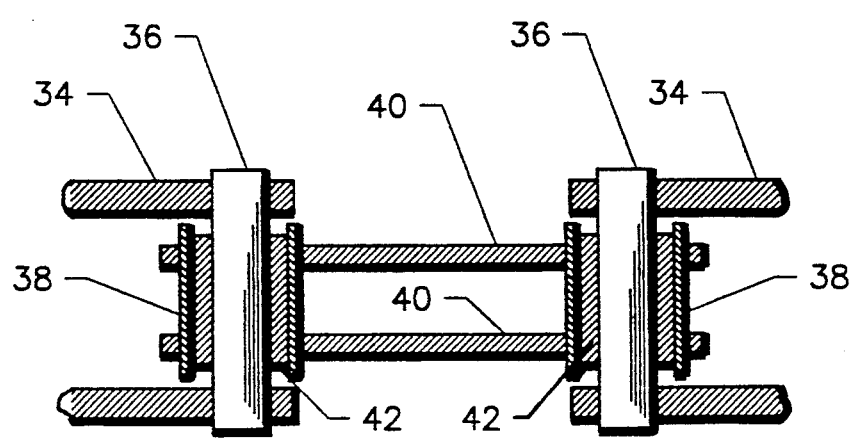
FIG. 3 is a cross sectional view of a spring loaded chain according to the invention.

Referring to FIG. 1 the chain 32 is supported on the sprocket body 10 by a plurality of support pads 33. Support pads 33 are attached to the sprocket body 10. Referring to FIG. 3 the chain 32 is comprised of a pair of outer link plates 34 connected to a common hinge pin 36 at each end. Hinge pin 36 passes through a tube 38. Tube 38 is connected to the ends of a pair of inner link plates 40. An elastomer bushing 42 connects the hinge pin 36 to the inner bore of the tube 38. The elastomer bushing 42 is simply an elastomer tube where the inner periphery of the tube is rigidly attached to the hinge pin 36 and its outer periphery is rigidly attached to the inner bore of the tube 38. The elastomer bushing 42 is interposed between the pin 36 and the tube 38 in such a manner so that it is compressed radially. The said compression causes a frictional force to exist thereby providing the said rigid attachment of the outer periphery of the elastomer bushing 42 to the inner periphery of the tube 38. The said attachment of the inner periphery of the elastomer bushing 42 to the pin is provided by vulcanization, bonding, or friction due to compression. When an elastomer bushing is constructed as specified above it also functions as a torsional spring that resist hinging of adjacent link plates 34 and 40. In this embodiment the elastomer bushing 42 serves a dual function both as a torsional spring and a load carrying bearing.

OPERATION OF THE INVENTION

As the chain 32 enters the sprocket it is forced to hinge about its hinge pin 36. Hinging causes the elastomer bushing 42 to be stressed so that it elastically deforms allowing the hinging to take place by deformation of the elastomer material.

Since hinging occurs by deformation of the elastomer material there is no sliding friction. This eliminates the need for lubrication. This also eliminates wear due to the ingress of dirt and other abrasive materials into the pins and bushings of bicycle type chains. Deformation of the elastomer during hinging makes the elastomer bushing also function as a torsional spring. The torsional spring resist hinging thereby preventing the chain from freely slamming onto the sprocket as it enters and seats on the sprocket. This is so because the spring force acts to reduce the impact velocity of the chain's links with the sprocket. Detrimental pounding can for all practical purposes be eliminated if the torsional spring force is strong enough to reduce substantially the impact velocity by greatly resisting hinging. The reduction or elimination of pounding due to chordal action allows for reduced wear and thus higher operating speeds.

As the sprocket body 10 rotates about the shaft 20 the sprocket teeth 12 are manipulated by the cam 18 to move about their pin 14. The cam 18 is profiled so that engagement of the sprocket teeth 12 with the chain 32 occurs after the chain 32 is completely seated on the supports 33 of the sprocket body. This prevents sliding of the chain 32 across the teeth 12 thus eliminating wear. This also eliminates the need for lubrication. This also eliminates the need for the chain to be equipped with a roller which allows for a much simpler chain construction. The elimination of sliding also eliminates accelerated wear when the chain and sprocket are operating in an abrasive environment.

While the above description contains may specificities, the reader should not construe these as limitations on the scope of the invention, but merely as exemplifications of preferred embodiments thereof. Those skilled in the art will envision many other possible variations that are within its scope. For example skilled artisans will readily be able to change the dimensions and shapes of the chain and sprocket. They will also be able to use different types of springs and spring arrangements for resisting hinging of the chain. They can outfit the sprocket body with resilient pads or rollers to support the chain. They can use the chain and sprocket for many different applications including: tracked vehicles, conveyors, power transmissions, etc. Accordingly the chain can be outfitted with a variety of protrusions and attachments. Furthermore, metallic bushings or roller bearings can be combined with the elastomer bushing and/or spring mechanism of the chain to increase the load capacity of the hinge joints. Artesians will also be able to construct the elastomer bushing with more than one elastomer annular rings axially spaced on the pin 36 and interposed between the pin 36 and the tube 38.

Accordingly the reader is requested to determine the scope of the invention by the appended claims and their legal equivalents, and not by the examples which have been given.

I claim:

1. A method for increasing speed in a chain engaging and traveling around a wheel comprising the steps of: providing a series of links to make into a chain, connecting adjoining links with a hinge, providing a spring means affixed at one end to one of an adjoining link and affixed at a second end to a second adjoining link, and resiliently resisting hinging of said adjoining links about said hinge with enough force to control detrimental pounding of said links on said wheel during engagement.

2. The method of claim 1 further comprising:
   resisting lateral motion of adjoining links with respect to each other.

3. The method of claim 1 further comprising the steps of: mounting a sprocket teeth to said wheel by a hinging means, providing a means for reciprocating said sprocket teeth with respect to said wheel, engaging said chain by said sprocket teeth.

4. A chain traveling over a sprocket wheel, having increased speed of running, comprising a chain including a series of links with adjoining links being connected by a hinge, and means for controlling detrimental pounding of links on the sprocket wheel during engagement including a spring resiliently resisting pivoting action of said links about said hinges affixed at one end to one of an adjoining link and affixed at a second end to a second adjoining link.

5. The apparatus of claim 4, said means for resiliently resisting pivoting action comprising:
a spring, affixed at one end to one said adjoining link and affixed at a second end to a second said adjoining link,
said spring forming an interior part of said hinge.

6. The apparatus of claim 4, further comprising:
said hinge comprising a pin affixed to one link passing through a tube affixed to an adjoining link,
said spring comprising an elastomer bushing interposed between said tube and said pin, affixed to said tube and to said pin.

7. A chain traveling over a sprocket wheel, having increased speed of running, comprising a sprocket having a plurality of teeth with means for manipulating the teeth to reciprocate relative to the sprocket and engage the chain, and means for preventing pounding of the chain on the sprocket including chain links which are joined by hinges and a spring means affixed at one end to one of an adjoining link and affixed at a second end to a second adjoining link for resiliently resisting pivoting action of the links about said hinges.

8. The apparatus of claim 7, said means for resiliently resisting pivoting action comprising:
a spring, affixed at one end to one said adjoining link and affixed at a second end to a second said adjoining link,
said spring forming an interior part of said hinge.

9. The apparatus of claim 7, further comprising:
said hinge comprising a pin affixed to one link passing through a tube affixed to an adjoining link,
said spring comprising an elastomer bushing interposed between said tube and said pin, affixed to said tube and to said pin.

10. A chain and sprocket combination comprising:
a chain made up of links, said links connected by a hinging means,
a spring with means for attaching said spring to the adjacent ends of said links so that the said spring resist hinging about said hinging means,
a sprocket with means for supporting said chain,
said sprocket having a plurality of teeth with means for manipulating said teeth to reciprocate relative to said sprocket and engage the said chain.

11. A chain and sprocket combination comprising:
a chain made up of links, wherein adjoining said links are connected by a hinging means,
said hinging means comprising a pin affixed to one said link passing through a tube affixed to a said adjoining link,
an elastomer bushing interposed between said tube and said pin, affixed to said tube and to said pin,
a sprocket with means for supporting said chain,
said sprocket having a plurality of teeth with means for manipulating said teeth to reciprocate relative to said sprocket and engage the said chain.

* * * * *